United States Patent [19]
Kaufman

[11] 3,884,409
[45] May 20, 1975

[54] HAND OPERATED DESOLDERING DEVICE

[76] Inventor: Harry Kaufman, 5709 White Hickory Cir., New Rochelle, N.Y. 33319

[22] Filed: Nov. 8, 1973

[21] Appl. No.: 413,905

[52] U.S. Cl. .................................. 228/20; 228/55
[51] Int. Cl. ............................................ B23k 3/00
[58] Field of Search .......... 228/19, 20, 55; 219/229; 118/63

[56] References Cited
UNITED STATES PATENTS

| | | | |
|---|---|---|---|
| 2,826,667 | 3/1958 | Brillinger | 228/20 |
| 3,469,759 | 9/1969 | Wansink | 228/20 |
| 3,637,129 | 1/1972 | Kaufman | 228/20 |

*Primary Examiner*—Francis S. Husar
*Assistant Examiner*—Gus T. Hampilos

[57] ABSTRACT

An improved desoldering device of the hand gun type is described. It includes separation of the cylinder chamber whose enlargement creates suction at an apertured heated tip into inner and outer chambers isolated by a first one-way air valve. A second one-way air valve closes off the outer chamber. Also described is an improved mounting of the heating tip and heater for easy replacement, means to prevent solder fouling of the movable parts and seals, and novel heating tips for desoldering soldered terminals of the wire-wrapped type and of a relay.

16 Claims, 9 Drawing Figures

HAND OPERATED DESOLDERING DEVICE

This invention relates to a desoldering device, and in particular to a device for heating a soldered joint or connection to the melting point of the solder and then applying reduced pressure to the molten solder to remove it from the joint.

In my prior U.S. Pat. No. 3,637,129, I describe and claim an improved desoldering device in the form of a hand gun with a reduced pressure developing structure comprising an enlarged displaceable cylinder having a closed end fitted over and surrounding an enlarged hollow piston to define a chamber having increased bore volume allowing a shorter stroke. The hollow piston end allows free air movement within the chamber. When the gun trigger is squeezed, the cylinder moves outward, enlarging the chamber confined volume and creating a suction at a heated tip coupled by means of a suction tube to the chamber. Solder sucked into the device upon hardening collects in the gun interior. In addition, my patented device mounted the heating tip on the suction tube connected to the piston, and provided a ceramic member to help heat-insulate rear portions of the device from the heated end.

While the patented device has worked well, certain problems have been encountered in its manufacture and operation. An important application for such a device is to desolder and allow removal of electronic components from a printed circuit board. In this use, it appears that molten solder can accumulate in the suction tube. If the operator is not careful and releases the trigger while the device is positioned over the circuit board, then the air pressure built-up by the returning cylinder can cause blowback of the molten solder out through the tip and onto the circuit board. Deposits of molten solder on the board can cause damage thereto, as by forming improper connections.

Other disadvantages involve the use of the ceramic member, which does not possess the strength and ruggedness of an all metal construction, and some difficulties encountered during replacement of the heater element, which requires frequent replacement when the device is used on a regular basis, such as on a production line.

The main object of the present invention is to provide an improved desoldering device of the type described in my patent and characterized by a simpler, stronger, and more rugged construction, a lighter and more compact arrangement, and which will avoid the solder blowback problem hereinbefore described.

These and other objects of the invention are achieved with a desoldering device in accordance with the invention, briefly stated, provided with means coupled to the reduced pressure developing chamber to prevent increased air pressure from building up therein when the suction establishing means is released. Other features include division of the chamber into first and second chambers each provided with a check valve, an all-metal construction providing rapid disassembly for easy replacement of a burnt-out heater, improved mounting of the heating tip for easy replacement and for providing a more rugged assembly, provision of means for ensuring linear displacement of the outer cylinder, and improved means for preventing solder fouling of the vacuum seals and for allowing easy removal of the hardened accumulated solder.

These and other features and advantages of the invention will be best understood from the following detailed description of one exemplary embodiment of the desoldering device of the invention taken in conjunction with the accompanying drawings, wherein.

Figure 1:
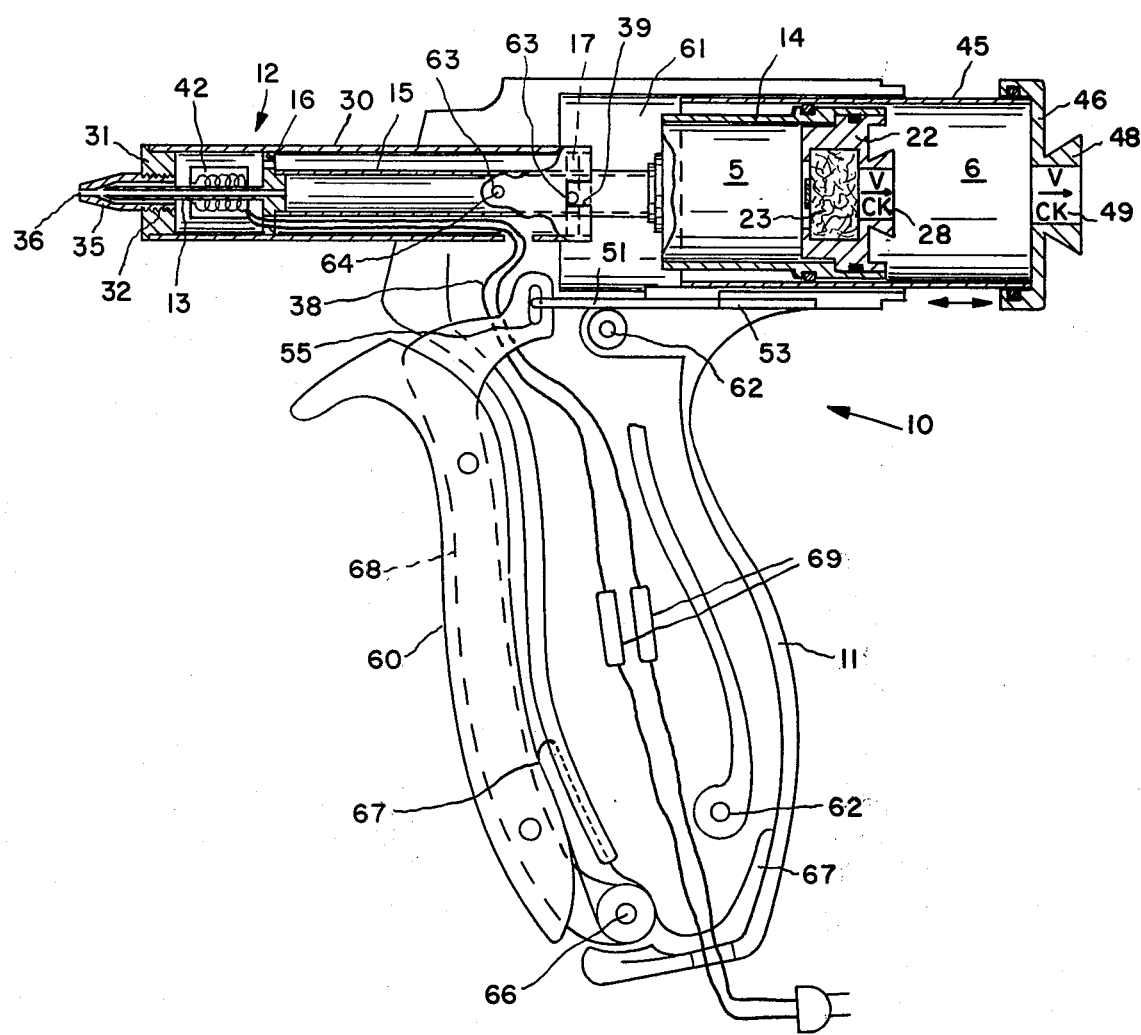
FIG. 1 is a plan view, partly cross-sectioned, of one form of desoldering device in accordance with the invention with part of the handle removed to show the interior construction.

Referring now to FIG. 1, one form of desoldering device in accordance with the invention comprises a gun-shaped body 10 comprising a handle portion 11 and a nozzle end 12.

Figure 2:
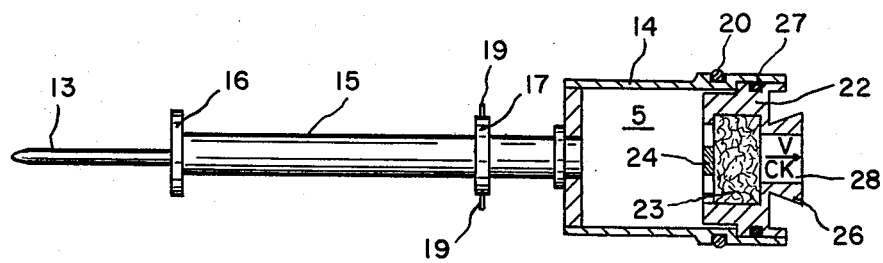
FIG. 2 is a plan, partly cross-sectioned view of the first chamber subassembly of the device illustrated in FIG. 1.
Figure 3:
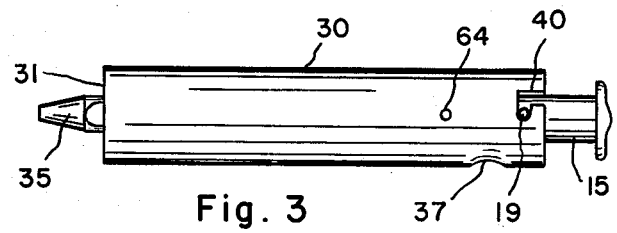
FIG. 3 is a plan view of a second subassembly containing the heating tip of the device illustrated in FIG. 1 shown mounted on part of the first subassembly.
Figure 4:
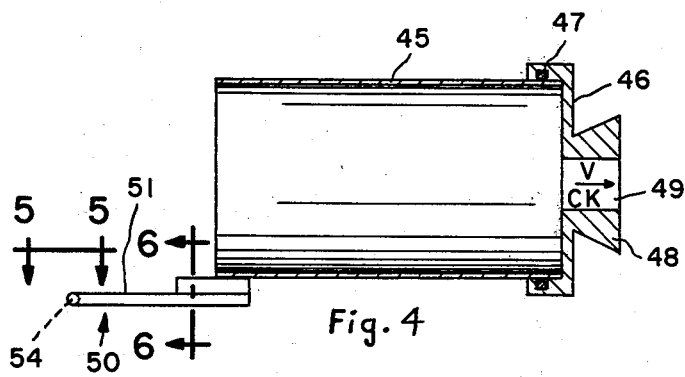
FIG. 4 is a plan, partly cross-sectioned view of a third subassembly comprising the displaceable cylinder of the device illustrated in FIG. 1.

The nozzle 12 comprises a substantially all metal construction made up of three subassemblies illustrated in FIGS. 2, 3 and 4.

The first subassembly, illustrated in FIG. 2, forms a first fixed volume air chamber 5 extending from a thin metal hollow tube 13 to an enlarged cylindrically-shaped metal piston end 14 forming a large bore volume. The thin hollow tube 13 and the piston end 14 are joined together as by brazing by an intermediate hollow cylindrical thin-walled metal tube 15. Two spaced metal flanges 16, 17 are mounted on the intermediate tube 15. The first assembly so far described forms an integral air-tight assembly except for the opening at the end of the thin tube 13. The remote flange 17 has two pins 19 extending outwardly in opposite directions. On the outside of the enlarged piston end is mounted an air-seal, as for example an O-ring 20.

A closure member 22 seals off the end of the first chamber 5. The closure 22 comprises a hollow body having reentrant portions enclosing a cavity for receiving an air-permeable deformable body 23 for allowing air to pass but capable of intercepting molten or solid solder particles. The solder stop 23 may consist, for example of plastic foam such as polyurethane foam, which contains many small air passageways. The center of the side of the foam 23 facing the nozzle front, thus the incoming solder, is preferably provided with a thin foil 24 for example of aluminum, which is not air-permeable. This allows the solid foil to receive the brunt of the incoming solder and prevent rapid clogging or burning of the foam. Air can flow through the foam 23 around the foil 24. The foil 24 may be cemented to the foam or provided with thin radially extending legs for securing same to the inside of the closure 22. Should the foam become clogged, it is easily removed from the closure cavity and replaced. The far side of the closure is provided with a projecting portion 26 for gripping same to pull the closure member out for removing the solder that accumulates within the first chamber 5. Air-seal means, as for example an O-ring 27 mounted on the outside of the closure, is employed to seal fit the closure 22 to the piston 14. A check valve 28 is secured as by a press-fit or cement in an opening in the closure 22. As indicated by the arrow, the check valve 28 allows air-flow to the right but not in the opposite direction.

The second subassembly, illustrated in FIG. 3, comprises a cylindrical thin-walled metal tube 30 whose right end is open but whose left end is closed off by a metal disc 31 having a threaded opening 32 at the center for receiving a heating tip 35. The heating tip 35 is of good heat conducting metal, such as copper or nickel-plated copper, and has a threaded end for engaging in a removable manner the threaded opening 32. An opening 36 extends axially through the heating tip. An opening 37 is provided in the wall of the tube 30 for passage of wires 38 for the heater. The tube 30 has at its right end means for mounting same to the first assembly. A preferred means comprises a bayonet connection, as illustrated, achieved by providing a straight slot 39 at one side of the tube end (see FIG. 1) and an L-shaped slot 40 at the opposite side (see FIG. 3, which is a view of the opposite side of the second subassembly). The tube 30 diameter is dimensioned intermediate that of the thin tube 13 and enlarged piston end 14 and so as to snugly accommodate the spaced flanges 16, 17 on the intermediate tube 15. The first subassembly as shown in FIG. 2 is rotated 90° about its longitudinal axis with respect to the view thereof illustrated in FIGS. 1 and 3.

To assemble, a heater coil 42 is slipped over the thin tube 13, the heater wires passed through a slot in the front flange 16, and then through the hole 37 in the separated tube 30, and then, with the tip 35 removed, the second subassembly is slipped over the first subassembly, the slots 39, 40 lined up and engaged with the pins 19, and then the cylinder 30 rotated to lock the pin 19 behind the recessed part of the slot 40. Next, the tip 35 is screwed into the end 31 and tightened. In the latter process the end of the thin tube 13 seats tight against an inner shoulder of the tip opening 36 providing a substantially air-tight joint. The tightening of the tip 35 also pulls the outer tube 30 against the pin 19 tightening the bayonet connection.

The piston end 14 is then inserted and seated within the third subassembly, illustrated in FIG. 4, which comprises the outer displaceable cylinder 45 whose right end is closed off by a closure member 46. The closure member has a flanged portion provided with air-sealing means 47, as for example an O-ring, for seal fitting the closure to the displaceable cylinder. Similar to the closure 22, the closure 46 has a projecting portion 48 for easy removal, and a check valve 49 sealed in an opening in the closure wall. The permitted air-flow direction is shown by the arrow. At the opposite open end of the cylinder 45 is secured a cylinder travel guide and actuator 50. This comprises an elongated strip of metal 51 rigidly secured to the cylinder 45 and having a projecting side 52 (into the drawing) which engages and slides in a groove 53 provided in the gun handle 11. The opposite end of the actuator 50 is provided with a curved end 54 which engages a slot 55 in a handle trigger 60.

The handle 11 simply comprises two separable molded plastic halves (only the bottom half is shown in FIG. 1) which clamps over the three subassemblies in a manner clamping the assembled first and second subassemblies tightly while providing a cavity 61 for free displacement of the movable third subassembly. The handles parts are held together by removable screws located in holes 62 provided in the handle. The assembled subassemblies are prevented from rotating within the handle 11 by providing two holes 63 each in opposite handle sides for receiving the two pins 19 extending from the flange 17, as well as two additional oppositely, radially-extending pins 64 mounted on the tube 30 of the second subassembly, and also by the cylinder guide 51 which rides within the groove 53 in the bottom handle half.

The trigger 60 is pivoted at a pin 66 secured in the handle 11. Also mounted on the pin is a strip or wire 67 of spring metal one of whose arms engages the handle wall and the other of which bears outwardly against the trigger 60, urging it to the left. A metal insert 68 secured in the trigger 60 terminates in the slot 55 which engages the end 54 of the actuator 50. By removing the end 54 from the slot, the cylinder 45 can be rotated and easily removed. Plug connectors 69 are provided within the handle for removable connection of the heater wires 38 to the usual electrical power cord.

In operation, the action of the spring 67 is to urge the trigger 60 to the left until the cylinder 45 has been displaced to the left of the position shown in FIG. 1 and the action stopped by a suitable stop, which may be located for example in the groove 53 or determined by the depth of the cavity 61. After the heater has heated the tip 35 to solder melting temperature, the latter is placed in contact with the soldered joint. When desoldering components from a printed circuit board, the aperture 36 in the tip can be pushed onto the component lead which generally projects through the board. After an instant or so of thermal contact, which melts the solder, the operator squeezes the handle, pulling the trigger 60 inward. This causes the cylinder 45 to be displaced to the right. As will be observed, adjacent to the first chamber 5 of fixed volume and separated therefrom by the closure 22 is formed a second chamber 6 defined by the displaceable cylinder 45 and separated from the outside air by the closure 46. When the cylinder 45 is displaced to the right, the chamber 6 volume increases, creating reduced pressure. No outside air to restore normal pressure can be supplied via the check valve 49, whose flow direction prevents this, but the check valve 28 will permit air flow into chamber 6, and thus the reduced pressure is transmitted to aperture 36 at the heated tip 35 sucking in the molten solder which collects in the tube 15 and in the chamber 5, where it hardens. Now when the trigger is released, spring pressure forces it out, returning the cylinder 45 to its original position, reducing the chamber 6 volume. The increased air pressure is vented now by the check valve 49, which releases the pressurized air to the outside. The check valve 28 prevents the increased air pressure from flowing back into chamber 5 causing blowback of molten solder out through the apertured tip.

Figure 7:
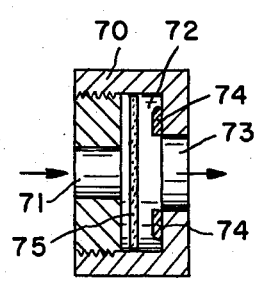
FIG. 7 is a cross-sectional view of a conventional check valve useful in the device of the invention.

Any known one-way air valve can be used for the check valves 28, 49. One conventional construction is illustrated in FIG. 7. It comprises a housing 70 having an inlet 71 leading to an inner cavity 72 from which extends an outlet 73. The cavity surface at the inlet 71 is flat, and the cavity surface at the outlet 73 is ribbed 74. The cavity contains a rubber flapper 75. When reduced pressure is established at the outlet 73, the flapper 75 is pulled against the ribbed 74 side, which allows air to pass from the inlet 71 around the flapper 75 and between the ribs 74 and out through the outlet 73. When the reverse pressure condition is established, the flapper 75 is pulled against the inlet 71 sealing off the opening and preventing air flow through the valve.

As will be evident from the foregoing, the desoldering device of the invention offers numerous improvements over my earlier patented construction. The separation of the single vacuum chamber into two chambers isolated by a one-way air flow valve, the inner chamber of fixed volume and the outer chamber of controllable variable volume and separated from the outside by a second one-way air-flow valve, ensures that reduced pressure is transmitted to the apertured tip while preventing the transmittal thereto of increased pressure, thereby eliminating the blowback problem. The solder stop located in the inner closure prevents solder fouling of the one-way air valves and of the air-seals. The location of the inner and outer closures provides for their easy removal and easy replacement of a clogged solder stop and of accumulated solder particles. The improved mechanical construction reduces size and weight, increases the ruggedness of the device, and provides for easy replacement of the heating tip and heater coil when desired.

Figure 8:
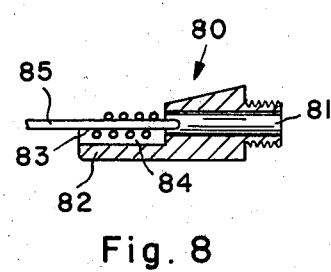
FIGS. 8 and 9 are cross-sectional views of special shaped heating tips for use with devices of the type described herein.
Figure 9:
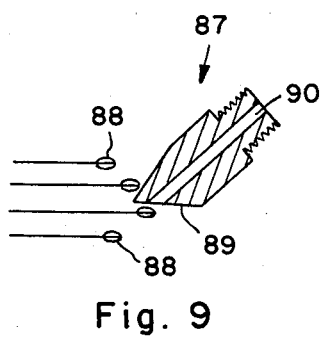

FIGS. 8 and 9 illustrate special heating tips for desoldering certain types of connections not possible with the heating tip 35 illustrated in FIG. 1. FIGS. 8 and 9 show heating tips both of which have threaded ends for mounting in the threaded hole 32 of the disc 31. The FIG. 8 tip, designated 80, comprises an axial aperture 81 through which the suction is developed which terminates at a forwardly projecting ledge 82 having a flat upper surface 83 containing a longitudinal channel 84, useful not only for desoldering terminals but also for soldering terminals of the wire-wrapped type, shown schematically at 85. As is known, once the wire of a wire-wrapped terminal has been removed, replacement requires soldering of the wire. In the soldering process however, excess solder tends to accumulate as a ball at the bottom wire turns. By disposing the tip 80 such that the terminal tip enters or lies adjacent the aperture 81 and with the bottom solder turns lying in the channel 84, the application of heat melts the excess solder and application of reduced pressure draws off the molten excess solder.

The tip 87 shown in FIG. 9 is especially useful for desoldering closely spaced projecting terminals 88 of for example a relay. The tip 87 differs from the tip 35 in that a flat 89 has been filed on the tip such that the through aperture 90 terminates at the flat 89 rather than at the point. The flat 89 is at an acute angle as shown relative to the axis through the aperture 90. This construction permits, as shown in FIG. 9, angular positioning of the gun allowing the tip 87 to be positioned between the terminals 88 with the suction aperture located at the joint to be desoldered.

Figure 5:
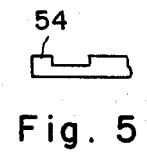
FIG. 5 is a plan view of the end of the cylinder guide illustrated in FIG. 4.
Figure 6:
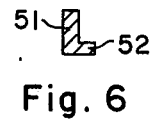
FIG. 6 is a cross-section along the line 6—6 of the guide illustrated in FIG. 4.

While a manually operable hand desoldering tool has been described, it will be evident, similar to the modification illustrated in FIG. 5 of my earlier patent, that pneumatic means can be substituted for the manual means for actuation of the cylinder 45 and operation of the tool.

While the principles of the invention have now been made clear in several illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A desoldering device comprising a hollow nozzle, means for heating the nozzle, means for establishing reduced pressure at the nozzle and comprising a first chamber and a second chamber, means under operator control for selectively enlarging and reducing the volume of the second chamber, and means for preventing increased air-pressure within the first chamber when the second chamber volume is reduced and comprising first one-way air-flow means pneumatically coupling the first and second chambers so as in an open position to allow air-flow from the first to the second chambers and in a closed position to prevent air-flow from the second to the first chambers, and means for actuating the first one-way air-flow means to the open position upon actuation of the second chamber volume enlarging means.

2. A desoldering device as claimed in claim 1 wherein means are provided for actuating the first one-way air-flow means to the closed position upon reduction in volume of the second chamber.

3. A desoldering device as claimed in claim 2 wherein second one-way air-flow means pneumatically couples the second chamber to the outside air so as in a closed position to prevent air-flow from the outside into the second chamber and in an open position to allow air-flow from the second chamber to the outside, and means for actuating the second one-way air-flow means to the closed position upon actuation of the second chamber volume enlarging means.

4. A desoldering device as claimed in claim 3 wherein the first one-way air-flow means is actuated to the open position and the second one-way air-flow means is actuated to the closed position both automatically in response to enlargement of the volume of the second chamber.

5. A desoldering device as claimed in claim 4 wherein the first one-way air-flow means is actuated to the closed position and the second one-way air-flow means is actuated to the open position both automatically in response to reduction of the volume of the second chamber.

6. A desoldering device as claimed in claim 1 wherein first closure means for the first chamber separates it from the second chamber, and second closure means for the second chamber separates it from the outside, said first one-way air-flow means being a first check valve mounted in the first closure means, said second one-way air-flow means being a second check valve mounted in the second closure means.

7. A desoldering device as claimed in claim 6 wherein said first and second closure means are removably sealed to the first and second chambers, respectively.

8. A desoldering device as claimed in claim 1 wherein air-permeable means are provided in the first chamber in the air-flow path from the nozzle to intercept solder in the air flow.

9. A desoldering device as claimed in claim 8 wherein the solder-intercepting means comprises a deformable body containing many air passageways.

10. A desoldering device as claimed in claim 9 wherein an air impermeable foil is mounted adjacent a center portion of the side of the deformable body facing the nozzle.

11. A desoldering device as claimed in claim 1 wherein a heating tip is mounted on the nozzle, said heating tip comprising a metal body having a rear portion for removable mounting on the nozzle and a forward portion for contacting relay terminals and a through aperture extending through the forward and rear portions, said forward portion being tapered with a flat side extending at an acute angle relative to the aperture, said aperture terminating in the flat side, whereby said heating tip is adapted to fit between the relay terminals with the flat side contacting an adjacent soldered connection.

12. A desoldering device as claimed in claim 1 wherein a heating tip is mounted on the nozzle, said heating tip comprising a metal body having a rear portion for removable mounting on the desoldering device and a forward portion for contacting a connection and a through aperture extending through the forward and rear portions, said forward portion being tapered with a ledge projecting frontwardly beyond the aperture, said ledge having a channel on its surface, whereby said heating tip is adapted to fit under a soldered wire-wrapped connection for removing excess solder.

13. A desoldering device comprising first, second and third subassemblies; said first subassembly comprising an elongated narrow tube terminating in an enlarged piston end, said elongated tube having a first section adjacent its narrow end for receiving a heating coil, and first closure means removably closing off the enlarged piston end; said second subassembly comprising an elongated tube removably mounted on the first subassembly so as to enclose the first section, and means for removably securing a heating tip to one end of the second subassembly elongated tube; said third subassembly comprising a displaceable cylinder mounted in air-sealing relationship over the enlarged piston end of the first subassembly, and second closure means removably closing off an end of the displaceable cylinder; an apertured heating tip removably mounted on said one end of the second subassembly; a heating coil removably mounted on the said first section of the first subassembly; means for selectively displacing the third subassembly in an outward direction relative to the first subassembly; and pneumatic means mounted to provide transmittal of reduced pressure from within the displaceable cylinder to the heating tip but to prevent transmittal of increased pressure thereto.

14. A desoldering device as set forth in claim 13 wherein the third subassembly comprises an elongated strip projecting forwardly therefrom for actuation of the displaceable cylinder and for guiding its travel.

15. A desoldering device comprising first, second and third subassemblies; said first subassembly comprising an elongated narrow tube terminating in an enlarged piston end, said elongated tube having a first section adjacent its narrow end for receiving a heating coil and a second section adjacent the piston end, spaced flanged means mounted on the second section, and first closure means removably closing off the enlarged piston end; said second subassembly comprising an elongated tube having a diameter intermediate that of the narrow tube and that of the enlarged piston end of the first subassembly and removably mounted on the spaced flanged means so as to enclose the first and second sections, and means for removably securing a heating tip to one end of the second subassembly elongated tube; said third subassembly comprising a displaceable cylinder mounted in air-sealing relationship over the enlarged piston end of the first subassembly, and second closure means removably closing off an end of the displaceable cylinder; a heating tip removably mounted on said one end of the second subassembly; a heating coil removably mounted on the said first section of the first subassembly; means for selectively displacing the third subassembly in an outward direction relative to the first subassembly; and one-way air valve means mounted in the first and second closure means, said one-way valve means being both oriented to allow air flow in the said outward direction.

16. A desoldering device as set forth in claim 15 wherein said first and second subassemblies are joined together by a bayonet connection.

* * * * *